United States Patent Office 3,454,594
Patented July 8, 1969

3,454,594
1-p-CHLOROBENZOYL-2-CARBOXYMETHYL-3-
INDOLYLACETIC ACIDS
John Martin Chemerda, Watchung, and Meyer Sletzinger,
North Plainfield, N.J., assignors to Merck & Co., Inc.,
Rahway, N.J., a corporation of New Jersey
No Drawing. Filed July 26, 1967, Ser. No. 656,039
Int. Cl. C07d 27/56
U.S. Cl. 260—326.13   2 Claims ABSTRACT OF THE DISCLOSURE
This invention relates to compounds of the formula

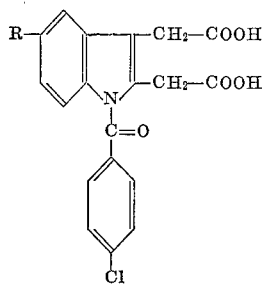

wherein R is either methoxy or dimethylamino, which are useful as intermediates in the preparation of 1-p-chlorobenzoyl-2-methyl-3-indolylacetic acids.

This invention relates to a new method of preparing certain 1-benzoyl-2-methyl-3-indolylacetic acid derivatives. More particularly, it relates to a method of preparing 1-p-chlorobenzoyl-2-methyl-5-R-3-indolylacetic acids of the Formula I:

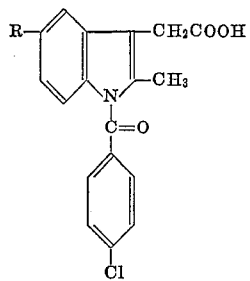

wherein R is methoxy or dimethylamino. These compounds are disclosed and claimed in U.S. Patent No. 3,161,654, issued Dec. 15, 1964, to Shen. It relates further to the provision of new intermediates for use in such method.

In the Shen patent, 1-p-chlorobenzoyl-2-methyl-3-indolylacetic acids are prepared by a series of reactions in which a 2-methyl-3-indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide a new method for obtaining these compounds. It is a further object of this invention to provide new intermediates for use in this method. Other objects will become apparent hereinafter.

In accordance with this invention, it has been discovered that 1-p-chlorobenzoyl-2-methyl-3-indolylacetic acids of Formula I can be prepared by the decarboxylation of 2,3-diacetic acid derivatives of the Formula II:

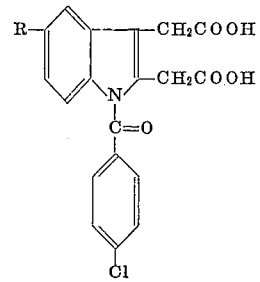

The decarboxylation can be effected by simply dissolving the compound of Formula II in an inert solvent and heating the solution until the evolution of carbon dioxide ceases. Evolution of carbon dioxide begins when the solution is heated to a temperature of above 30° C. More rapid evolution is attained at higher temperatures. The solution may be heated to the reflux temperature of the solvent for more rapid decarboxylation. Solvents which may be used for the purposes of this reaction are aromatic hydrocarbons such as benzene, toluene and xylene; halogenated aromatic solvents such as chlorinated benzene, including monochloro- and dichlorobenzene; halogenated aliphatic hydrocarbons such as chloroform or methylene dichloride; and high boiling ethers such as glyme and diglyme.

After decarboxylation, the desired compound of Formula I may be isolated by evaporation of the solvent in vacuo and recrystallaization of the residue in a solvent such as t-butanol or tetrahydrofuran.

The starting materials for the process of the present invention are new compounds which may be obtained several different methods as outlined in the following flow sheet.

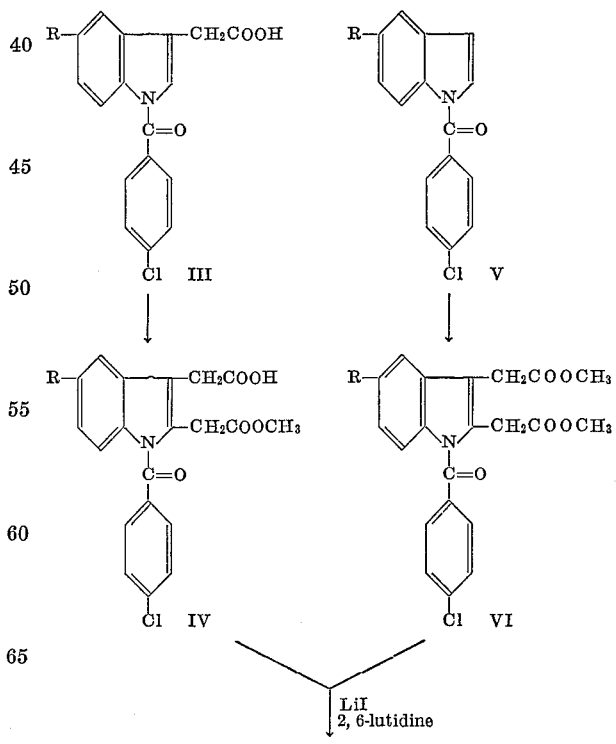

COMPOUND OF FORMULA II

Thus, a 1-p-chlorobenzoyl-3-indolylacetic acid (compound of Formula III) may be carbomethoxymethylated at the 2-position by treatment with one equivalent of methyl diazoacetate in a solvent such as tetrahydrofuran under ultraviolet irradiation. The irradiation is continued until the evolution of nitrogen ceases. The reaction mixture should be maintained at ambient temperatures by external cooling if necessary. Quenching of the reaction mixture in ice water precipitates the methyl 1-p-chlorobenzoyl-2-methoxycarbonylmethyl-indole-3-acetate of Formula IV.

The compound of Formula IV may be converted to the starting material of Formula II by de-esterification with a reagent such as lithium iodide and 2,6-lutidine at reflux temperatures under a nitrogen atmosphere.

Alternatively, the compound of Formula II may be prepared from the 1-p-chlorobenzoyl-5-R-indole of Formula V by treatment of the latter with two equivalents of methyl diazoacetate. Irradiation of the reaction mixture with ultraviolet light results in the formation of the compound of Formula VI. The latter is converted to the starting material of Formula II by de-esterification with a reagent such as lithium iodide in 2,6-lutidine.

As yet another alternative, the starting compounds of Formula II may be obtained by the following reaction scheme:

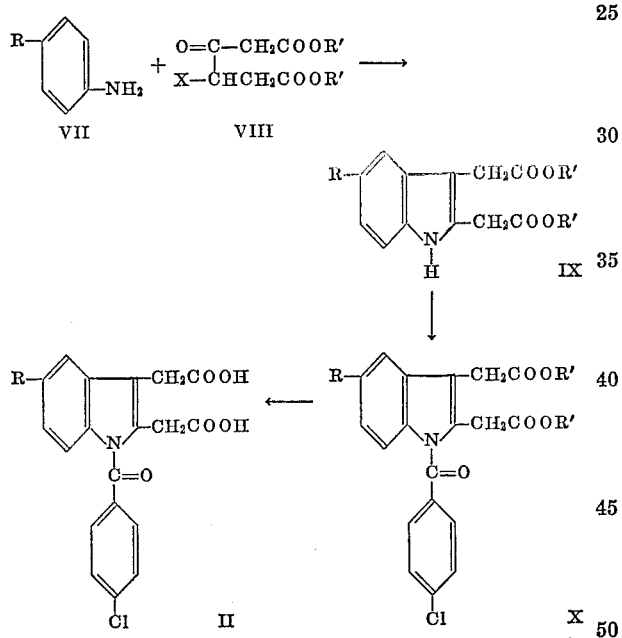

In the foregoing formulae, R is as defined above, X is bromo or less preferably chloro or iodo, and R' is lower alkyl (e.g., methyl or t-butyl) or alkyl, especially monocyclic ar(lower alkyl) such as benzyl or dihydropyranyl-2-. The reaction between VII and VIII can be effected by heating a mixture of the compounds containing an excess of the aniline derivative to reflux temperature. The reaction can be conducted with or without solvents. Suitable solvents are benzene, toluene, high boiling ethers, alcohols and various other inert liquids in which the reactants are soluble. The resulting indole derivative of Formula IX can be isolated from the reaction mixture by extraction with a solvent such as chloroform, and then purified by conventional means. Compound IX can be converted to Compound X by acylation with a 1-p-chlorobenzoyl halide such as the iodide, bromide or especially the chloride. The acylation is achieved by mixing Compound IX with at least one equivalent of the acylating agent in the presence of sodium hydride and dimethylformamide. De-esterification of Compound X yields the desired starting material of Formula II. De-esterification can be effected in several ways. If R' is methyl, it is best effected by treatment with lithium iodide and 2,6-lutidine. If R' is benzyl or dihydropyranyl-2-, de-esterification can be accomplished by hydrogenolysis in the presence of a palladium catalyst. If R' is t-butyl, de-esterification is accomplished by pyrolysis until a theoretical amount of isobutylene has evolved.

The following examples are presented to further illustrate the present invention.

EXAMPLE 1

Preparation of methyl 1-p-chlorobenzoyl-2-methoxycarbonylmethyl-5-methoxyindole-3-acetate To 0.01 mole of 1-p-chlorobenzoyl-5-methoxyindole in 100 ml. of tetrahydrofuran was added a solution of 0.021 mole of methyl diazoacetate in 25 ml. of tetrahydrofuran. When the addition was completed (15 minutes), the reaction mixture was irradiated with ultraviolet light until nitrogen evolution ceased. The temperature was kept at 20–25° C. during the irradiation by external cooling. When the irradiation period was over, the reaction mixture was poured into one liter of ice water and the precipitated product was filtered off and purified by recrystallization from t-butanol.

The reaction may also be carried out by heating or by using catalysts such as copper powder, copper salts or di-$\mu$-chlorodi-$\pi$-allyldipalladium instead of irradiating with ultraviolet light. Also, it is preferable to use a slight excess over the required two equivalents of methyl diazoacetate. Similarly, the reaction may be carried out at any temperature between the freezing and the boiling points of the solvent, although temperatures such as are used in the example are preferred. Finally, other solvents may be used in place of tetrahydrofuran. Among these are ether and dioxane.

Following the foregoing procedure except for the substitution of 1-p-chlorobenzoyl-5-dimethylaminoindole in place of the indole used therein, there is obtained methyl 1-p-chlorobenzoyl-2-methoxycarbonylmethyl-5 - dimethylaminoindole-3-acetate.

EXAMPLE 2

Preparation of 1-p-chlorobenzoyl-2-methoxycarbonylmethyl-5-methoxyindole-3-acetic acid To 0.01 mole of 1-p-chlorbenzoyl-5-methoxy-3-indolylacetic acid in 100 ml. of tetrahydrofuran was added a solution of 0.011 mole of methyl diazoacetate in 13 ml. of tetrahydrofuran. When the addition was completed (in about 10 minutes), the reaction mixture was irradiated with ultraviolet light until nitrogen evolution ceased. The temperature was kept at 20–25° C. during the irradiation by external cooling. When the irradiation period was over, the reaction fluid was poured into one liter of ice water and the precipitated product was filtered off and purified by recrystallization from t-butanol.

The same product is obtained when the methyl ester of the starting material used in Example 2 is used instead.

Likewise, the corresponding 5-dimethylaminoindole is obtained by substituting 1-p-chlorobenzoyl - 5 - dimethylamino-3-indolylacetic acid in the foregoing procedure.

As in Example 1, the diazo reagent may be decomposed other ways than by irradiation (by using catalysts or heat). Similarly, temperatures and solvents may be varied as described in Example 1.

EXAMPLE 3

Preparation of 1-p-chlorobenzoyl-2-carboxymethyl-5-methoxy-3-indolylacetic acid

A stirred mixture of 1-p-chlorobenzoyl-2-methoxycarbonylmethyl-5-methoxy-3-indolylacetic acid (0.01 mole), 8.5 g. of anhydrous lithium iodide and 200 ml. of freshly distilled 2,6-lutidine was refluxed under nitrogen for 8 hours. On cooling to room temperature, 100 ml. of chloroform and 100 ml. of cold 2 N-hydrochloric acid were added and, after shaking, the layers were separated. The aqueous phase was back-extracted with chloroform. The combined organic extracts were washed well with cold dilute hydrochloric acid (two portions of 100 ml.), with water (two portions of 100 ml.), then dried over magnesium sulfate. Removal of the solvent under reduced pressure afforded 1-p-chlorobenzoyl-2-carboxymethyl-5-methoxy-3-indolylacetic acid.

The corresponding 5-dimethylamino derivative is obtained by substituting 1-p-chlorobenzoyl-2-methoxycarbonylmethyl-5-dimethylamino-3-indolylacetic acid in the procedure of Example 3. The product is precipitated from the HCl washes by adjusting the pH to 5–6 by addition of base.

EXAMPLE 4

Preparation of 1-p-chlorobenzoyl-2-carboxymethyl-5-methoxy-3-indolylacetic acid

A stirred mixture of methyl 1-p-chlorobenzoyl-2-methoxycarbonylmethyl-5-methoxyindole-3-acetate (0.01 mole), 17 g. of anhydrous lithium iodide and 400 ml. of freshly distilled 2,6-lutidine was refluxed under nitrogen for 8 hours. On cooling to room temperature, 100 ml. of chloroform and 100 ml. of 2 N-hydrochloric acid were added, and, after shaking, the layers were separated. The aqueous phase was back-extracted with chloroform. The combined organic extracts were washed well with cold diluted hydrochloric acid (two portions of 100 ml.), with water (two portions of 100 ml.), then dried over magnesium sulfate. Removal of the solvent under reduced pressure afforded 1-p-chlorobenzoyl-2-carboxymethyl-5-methoxy-3-indolylacetic acid.

The corresponding 5-dimethylamino derivative is obtained by substituting methyl 1-p-chlorobenzoyl-2-methoxycarbonylmethyl - 5 - dimethylaminoindole-3-acetate in the procedure of Example 4. The product is obtained from the HCl washes by adjusting the pH to 5–6 by addition of base.

EXAMPLE 5

1-p-chlorobenzoyl-2-methoxycarbonylmethyl-5-methoxyindole-3-acetic acid (A) Methyl 2 - methoxycarbonylmethyl-5-methoxyindole-3-acetate.—A well-stirred mixture of p-anisidine (26.64 g., 0.20 mole) and dimethyl-3-keto-4-bromoadipate (26.71 g., 0.1 mole) was heated under nitrogen to 100° C. and kept at that temperature for 3 hours. The mixture was then cooled and the crude product removed by extraction into chloroform. The extract was washed once with dilute hydrochloric acid, then with water, dried over anhydrous magnesium sulfate and the solvent removed to afford crude methyl 2-methoxycarbonylmethyl-5-methoxyindole-3-acetate.

(B) To a slurry of 5 g. of 50% sodium hydride emulsion in 50 ml. of dimethylformamide at 5–10° C. was added a solution of 27 g. of the product of part A of this example in 300 ml. of dry dimethylformamide. This mixture was stirred over one hour to complete the sodio salt formation. To this solution was added dropwise a solution of 24 g. of p-chlorobenzoyl chloride over a period of one hour. The mixture was cautiously treated with 10 ml. of acetic acid and the reaction mixture diluted further in one liter of water. The mixture was extracted thoroughly with chloroform. The chloroform extracts were combined, washed with water, dried and concentrated to give methyl 1-p-chlorobenzoyl-2-methoxycarbonylmethyl-5-methoxyindole-3-acetate.

(C) Preparation of 1-p-chlorobenzoyl-2-methoxycarbonylmethyl-5-methoxyindole-3-acetic acid.—A stirred mixture of the product of part B of this example (0.01 mole), 8.5 g. of anhydrous lithium iodide and 200 ml. of freshly distilled 2,6-lutidine was refluxed under nitrogen for 8 hours. On cooling to room temperature, 100 ml. of chloroform and 100 ml. of cold 2 N-hydrochloric acid (two portions of 100 ml.), with water (two portions of 100 ml.) and dried over magnesium sulfate. Removal of the solvent under reduced pressure afforded 1-p-chlorobenzoyl-2-carboxymethyl-5-methoxy-3-indolylacetic acid.

Following the procedure of Example 5 except for the substitution in part A thereof of N,N-dimethylphenylene diamine for p-anisidine, there is obtained 1-p-chlorobenzoyl - 2 - methoxycarbonylmethyl - 5 - dimethylamino-3-indolylacetic acid. The product is isolated from the HCl washes by adjustment of the pH to 5–6 by addition of base.

EXAMPLE 6

Preparation of 1-p-chlorobenzoyl-2-methyl-5-methoxy-3-indolylacetic acid

A solution of 0.01 mole of 1-p-chlorobenzoyl-2-carboxymethyl-5-methoxy-3-indolylacetic acid in 100 ml. of ortho-dichlorobenzene was heated under reflux until the evolution of carbon dioxide ceased, after which heating was continued in vacuo until the solvent was evaporated. The residue was recrystallized from t-butanol, giving the product, 1-p-chlorobenzoyl-2-methyl-5-methoxy-3-indolylacetic acid.

Alternatively, the decarboxylation reaction of the foregoing example can be accomplished using a solvent such as chloroform or methylene dichloride and refluxing the reaction mixture until the evolution of carbon dioxide ceases.

We claim:
1. The compound of the formula:

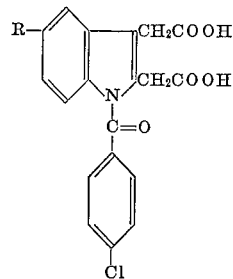

wherein R is methoxy or dimethylamino.
2. The compound of claim 1 wherein R is methoxy.

References Cited

UNITED STATES PATENTS 3,201,414   8/1965   Shen _____ 260—326.12

ALEX MAZEL, *Primary Examiner.*

J. A. NARCAVAGE, *Assistant Examiner.*

U.S. Cl. X.R.

260—326.14